US007231356B1

(12) United States Patent
Ward et al.

(10) Patent No.: US 7,231,356 B1
(45) Date of Patent: Jun. 12, 2007

(54) OPERATING PLAN FOR MACHINERY

(75) Inventors: Glenn G. Ward, Wallingford, PA (US); Donald J. Collins, Voorhees, NJ (US); Richard A. Stutchfield, Mickleton, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1136 days.

(21) Appl. No.: 09/671,871

(22) Filed: Sep. 28, 2000

Related U.S. Application Data

(60) Provisional application No. 60/217,311, filed on Jul. 10, 2000.

(51) Int. Cl.
*G06F 9/46* (2006.01)

(52) U.S. Cl. .......................................... 705/8; 364/512
(58) Field of Classification Search .............. 705/7–10; 364/512
See application file for complete search history.

(56) References Cited

U.S. PATENT DOCUMENTS

| | | | | |
|---|---|---|---|---|
| 4,875,162 A | * | 10/1989 | Ferriter et al. ................. | 705/29 |
| 4,964,060 A | * | 10/1990 | Hartsog ........................... | 703/1 |
| 5,189,606 A | * | 2/1993 | Burns et al. .................... | 705/10 |
| 5,301,320 A | | 4/1994 | McAtee et al. | |
| 5,557,537 A | * | 9/1996 | Normann et al. ............... | 703/1 |
| 5,826,239 A | | 10/1998 | Du et al. | |
| 5,845,258 A | * | 12/1998 | Kennedy ........................ | 705/8 |
| 5,867,824 A | | 2/1999 | Saito et al. | |
| 5,870,545 A | | 2/1999 | Davis et al. | |
| 5,960,404 A | | 9/1999 | Chaar et al. | |
| 5,960,420 A | | 9/1999 | Leymann et al. | |
| 5,963,910 A | * | 10/1999 | Ulwick ........................... | 705/7 |
| 5,999,911 A | | 12/1999 | Berg et al. | |
| 6,041,306 A | | 3/2000 | Du et al. | |
| 6,052,684 A | | 4/2000 | Du | |
| 6,408,263 B1 | * | 6/2002 | Summers ........................ | 703/6 |
| 6,578,006 B1 | * | 6/2003 | Saito et al. .................... | 705/9 |
| 2002/0082950 A1 | * | 6/2002 | Anderson et al. ............. | 705/27 |

OTHER PUBLICATIONS

Windchill 2.0; Robert Mills; Computer-Aided Engineering; Cleveland: Mar. 1999; vol. 18; Iss. 3; p. 22, 3 pgs; pp. 1-4.*
E-maintenance management; Andrew Marks; Chain Store Age; New York : May 2000; vol. 76, Iss. 5; p. 302, 1 pgs; pp. 1-2.*

* cited by examiner

*Primary Examiner*—Andrew Joseph Rudy
*Assistant Examiner*—Vanel Frenel
(74) *Attorney, Agent, or Firm*—Howard Kaiser

(57) ABSTRACT

A methodology for engineering or re-engineering workflow management strategy, in furtherance of business excellence, is especially suitable for an organization whose business operations involve machinery. The methodology includes the identification of internal and/or external core functions, the preparation of individual written reports each pertaining to a different core function, the assimilation of such reports into a manual for use by the entire organization, the formation of such organization into internal and/or external core function units (which, typically, are at least substantially in accordance with the previously identified core functions), and the creation of one or more modes of systematic communication among the core function units. Suggested internal core functions include facilities, budget and contracts. Suggested external core functions include life cycle management, acquisition, research and development, test and evaluation, in-service engineering, integrating logistic support, program management and platform management.

22 Claims, 5 Drawing Sheets

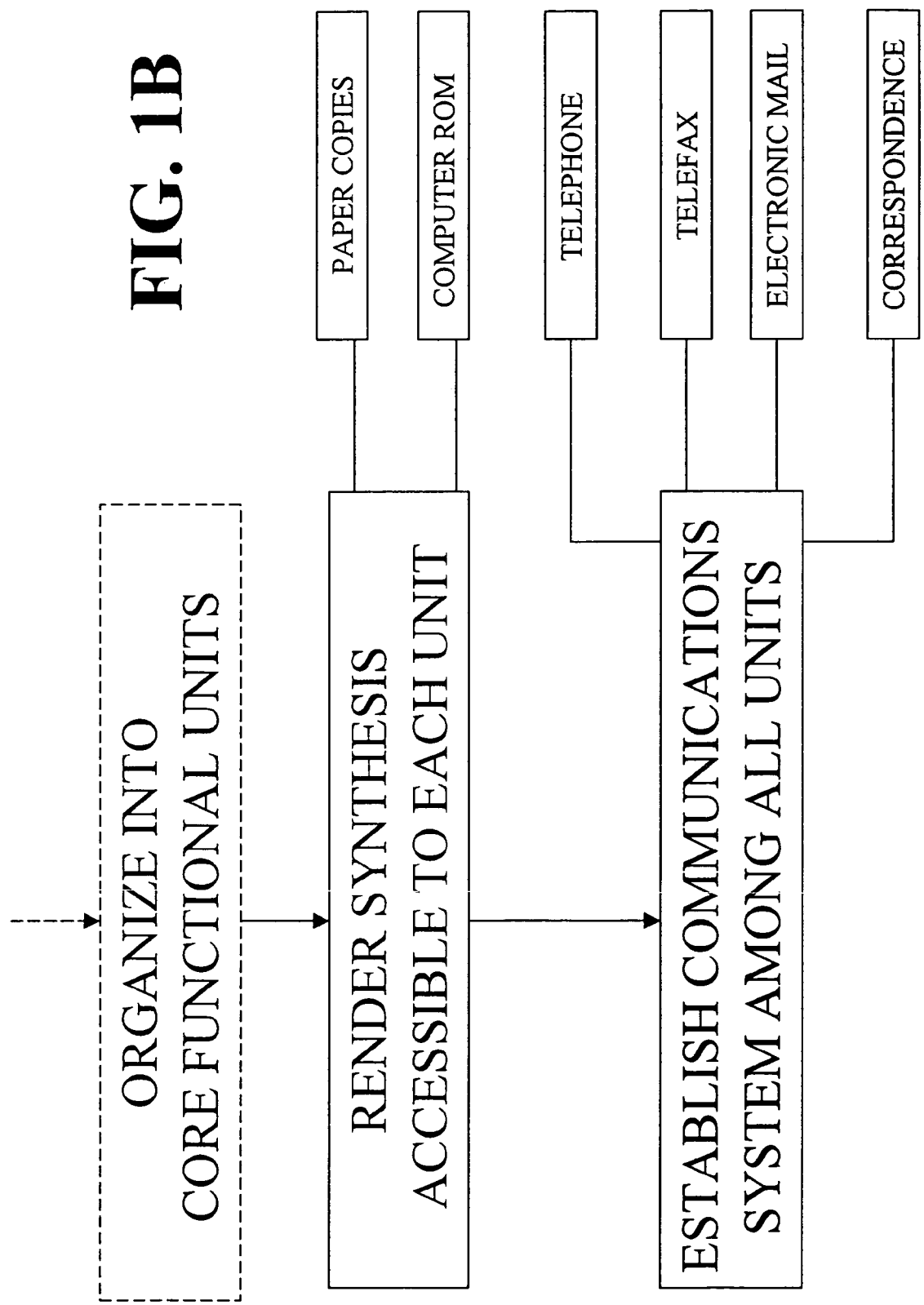

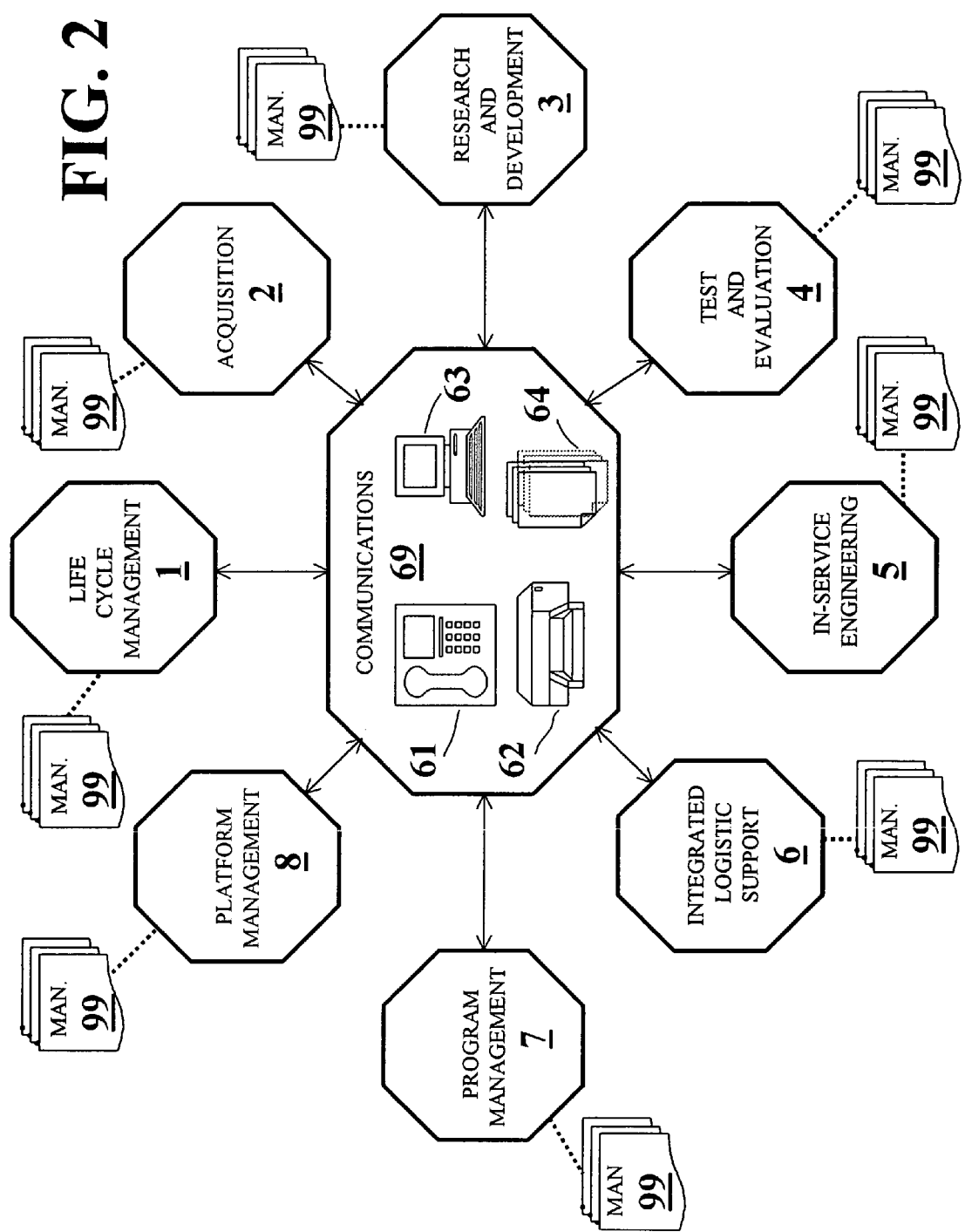

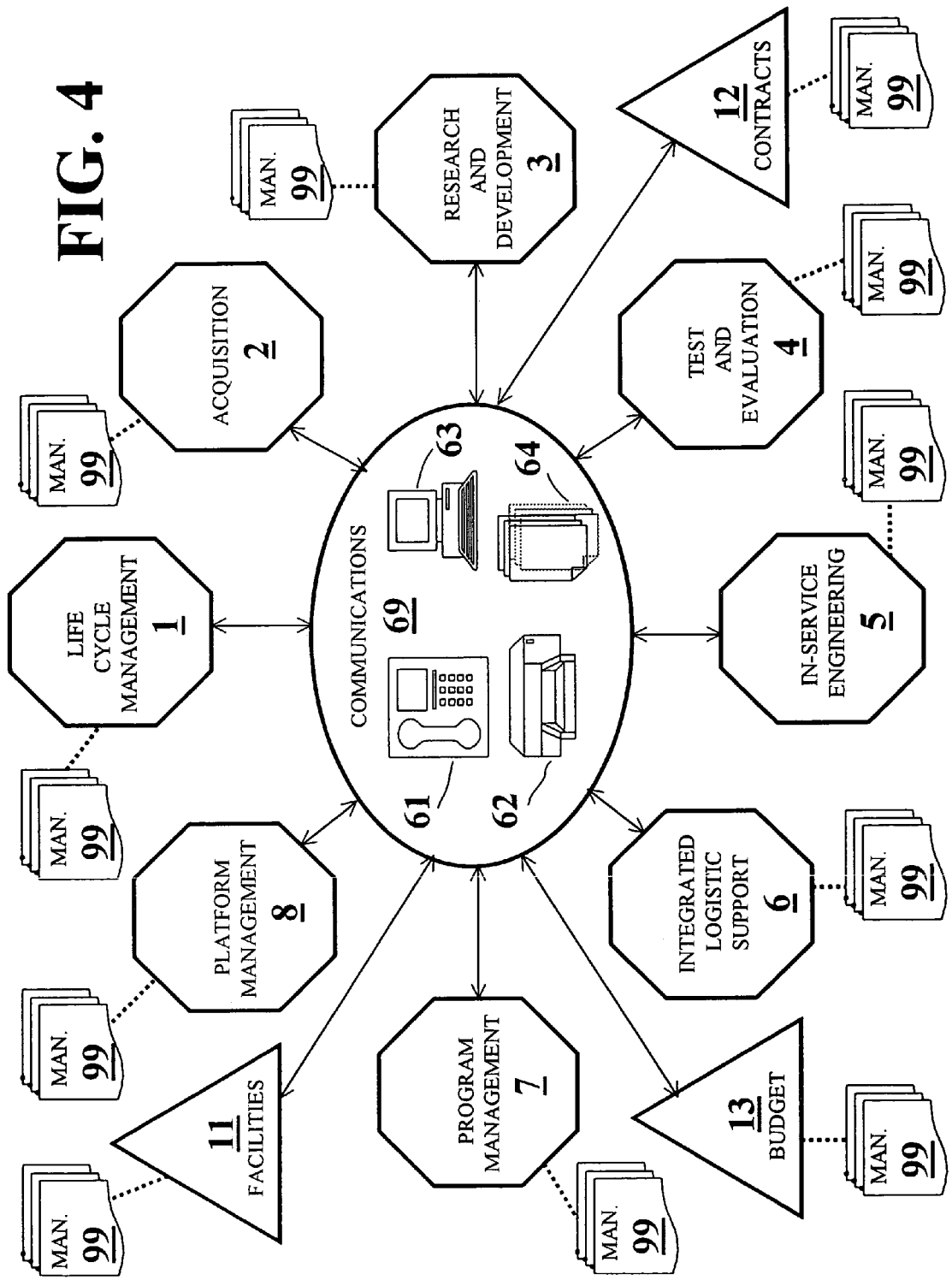

OPERATING PLAN FOR MACHINERY

CROSS-REFERENCE TO RELATED APPLICATION

This application claims the benefit of U.S. Provisional Application No. 60/217,311 filed 10 Jul. 2000, entitled "Operating Plan for Machinery," incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to workflow process management of business organizations, more particularly to methods for managing business and life cycle operations which involve various functions in association with various types of machinery.

Over the last decade the U.S. Navy has actively been pursuing a strategy to reduce the cost of building, maintaining and operating their ships. The strategy included closing and realigning facilities and bases, reducing personnel, reforming the acquisition process and privatization of certain functions. This strategy has impacted the business of Navy Research & Development (R&D) centers such as The Naval Surface Warfare Center, Carderock Division (NSWCCD). The major aspects of this strategy which have affected the business of the Philadelphia site (Ship Systems Engineering Station) of NSWCCD, i.e., NSWCCD-SSES, are: base realignment and closure (BRAC); NAVSEA Downsizing; transferring life cycle management (LCM) to Philadelphia.

BRAC had a major impact on the world of machinery. The Annapolis site of NSWCCD was selected to close in 1995 and its Machinery R&D functions transferred to Philadelphia. For the first time, all key technical functions of the life cycle of Machinery were located at one site. The downsizing of NAVSEA meant that SEA 03 would no longer have the manpower to perform their traditional functions. The Navy would be required to transfer certain functions to the field. Ultimately, having all the key elements of Machinery located at one location made the decision to transfer life cycle management (LCM) from SEA 03 to Philadelphia straightforward.

A business strategy known as "workflow process re-engineering" has emerged in the business world the last several years. Workflow processes are being rethought and reimplemented by many organizations in order to achiever higher levels of quality, cost-efficiency, production and service. In an era of workforce downsizing, faster customer response and shorter time-to-market, organizations are effectuating workflow process re-engineering in a variety of realms.

The propitious circumstances for effectuating workflow process re-engineering gave rise to the present invention. Historically, the various functions of the business operations of NSWCCD had not been organized into a coherent whole. The transferring of LCM from SEA 03 to Philadelphia afforded NSWCCD-SSES an opportunity to reexamine the business of machinery.

SUMMARY OF THE INVENTION

In view of the foregoing, it is an object of the present invention to provide an integrative methodology for business and life cycle management of machinery.

It is another object of the present invention to provide such an integrative methodology which attains superior results in terms of quality, cost-efficiency, production and service.

In accordance with many embodiments of the present invention, a method of organizing a workflow management system (such as relating to machinery operations) comprises the steps of: identifying core functions; producing information for each core function; establishing core function units; integrating said information into a coherent, uniform presentation for use by said core function units; and instituting communications among said core function units.

According to some inventive embodiments, a method is provided for defining and executing the flow of management operations (such as pertains to machinery). The method comprises the steps of: establishing plural units, each unit involving a different core function; formulating a manual which prescribes the flow both intrarelationally within each unit and interrelationally between the units; and, enabling communication in and among the units, in furtherance of the flow.

Also in accordance with some embodiments of the present invention, a system for performing workflow management (such as relating to machine operations) comprises: a plurality of core functional units; a manual for utilization by the core functional units, the manual defining the workflow within and between the core functional units; and, means for communication within and between the core functional units.

The present invention was made in response to a need to define and standardize organizational operations. The U.S. Navy's Naval Surface Warfare Center, Carderock Division, "Directorate 90 Operating Plan for Machinery" manual dated 9 Jul. 1999, appended hereto marked APPENDIX A, discloses many aspects of this invention in textual and flow diagrammatic form. Previously, NAVSEA had pulled together numerous knowledgeable people to assist all operations; however, a lack of consistency and integration existed amongst the processes. Because functions were never concisely defined, the inventors, as Directorate 90 personnel, became interested in developing a set of standard procedures outlining these functions.

Basic to the present invention is the recognition that all processes of NSWCCD-SSES can be practiced as subsets of life cycle management (LCM). According to this invention, LCM is divided into external functions and internal functions, and further divided into eleven areas. The "Directorate 90 Operating Plan for Machinery" (OPM) manual dated 9 Jul. 1999, appended hereto marked APPENDIX A, is a compliation of separate write-ups in an established, standardized format, and serves as a structured reference for all NSWCCD-SSES operating processes. Each write-up comprises (i) a narrative, (ii) a flowchart and (iii) a detailed procedure.

The inventive "Operating Plan for Machinery" (OPM) is a consquency of a thoughtful reconsideration of the business of machinery. The inventive Life Cycle Management (LCM) is a critical function of the inventive OPM. According to the present invention, a new approach to LCM is taken, wherein several goals for LCM have been identified. These goals include the following: improve system reliability, maintainability and availability; reduce life cycle costs; reduce the time required to introduce new or enhanced capabilities into the fleet.

Prior to the transfer of LCM to NSWCCD-SSES, engineering was split into Life Cycle Engineering, which was done by SEA 03, and In-Service Engineering, which was done by NSWCCD-SSES. This split was not a natural divide, and resulted in redundant capabilities and inefficiencies. The inventors believed that engineering functions should not be divided without communication and interaction therebetween. By inventively combining the engineering functions previously performed by SEA 03 and those performed by NSWCCD-SSES, the Navy will receive significant savings.

The inventors thus sought to consolidate the engineering functions. To this end, the functions of LCM needed to be addressed and the OPM required definition and development. The Code 90 Department Management Team (DMT) realized that the OPM had specific areas that required a documented standardized approach. Therefore the DMT created ten Core Process (CP) teams. These CP teams were separated into two major categories, viz., Technical Core Process (TCP) teams and Internal Core Process (ICP) teams. The Technical Core Process (TCP) teams were: Life Cycle Management; Program/Platform Management; Research and Development; Acquisition Support; Logistics; Test and Evaluation; In-service Engineering. The Internal Core Process (ICP) teams were: Facility Planning; Budget Strategy; Contracting Requirements. These Core Process teams were to define their core area, develop their process flows and identify "links" to others Core areas.

The inventors realized that the mission of the Machinery Directorate of NSWCCD-SSES would require adaptation to support its new role as Life Cycle Managers. In order to adapt to LCM functions it was critical that the processes, currently performed differently by many people, be defined by one operational plan followed by the entire Directorate. In January 1999, the Directorate Head and Department Heads formed ten teams to begin to describe key process areas. The Technical Core Process (TCP) teams were: Life Cycle Management; Program/Platform Management; Research and Development; Acquisition Support; Logistics; Test and Evaluation; In-service Engineering. The Internal Core Process (ICP) teams were: Facility Planning; Budget Strategy; Contracting Requirements. As the teams began to meet they formulated different ideas of processes in their designated areas. Following the first outbrief in March 1999, the teams were directed to follow a specific format in order to create the Operating Plan for Machinery. Eventually, the Program Management and Platform Management were established as separate core functions, but initially a single team addressed issues encompassed by both core functions.

The format used consisted of three basic parts. First, each team was asked to prepare a flow chart to clearly define their process area. Second, each team was asked to write a narrative which would serve as a comprehensive story of how each specific process is an integral part of our business. Lastly, each team was asked to write a procedure which serves as a technical step-by-step description that is measurable and has the ability to be certified. The combination of these three elements across all teams provided the foundation for the inventive Operating Plan for Machinery, as compiled in the "Directorate 90 Operating Plan for Machinery" (APPENDIX A).

The inventive Operating Plan for Machinery describes two key areas which are the foundation for all process elements of Directorate 90. Part I explains the ability of the Directorate to execute its mission and maintain leadership in Machinery, and is based on the clear definition of eleven critical processes. The Life Cycle Model for Machinery comprises eight process areas which are all linked together at various points. These eight categories describe how Directorate 90 will execute its mission as Life Cycle Managers for Machinery. A key feature of this model is that no one process stands alone, each area is dependent on other areas. This provides clear documents of the complexity of Life Cycle Management while breaking the process down to eight manageable categories, as follows: Life Cycle Management; Acquisition; Research and Development; Test and Evaluation; In-Service-Engineering; Integrated Logistics Support; Program Management; Platform Management. Part II of the Operating Plan comprises the Business Model for Machinery. This model comprises the following three critical business areas: Budget; Facilities; Contracting. Although all eleven areas are linked, each of the eleven process descriptions has a distinct flavor and individual key elements. The eight processes of the invention's Life Cycle Model are more fully described in the detailed description hereinbelow.

An alternative approach would involve development of a book consisting of just a narrative; however, such a book would not contain an appropriately detailed representation of the process and policy. Neither this nor other alternative approaches which have been considered offer a comprehensive explanation of the process and policy, as does the Operating Plan for Machinery in accordance with the present invention.

As previously emphasized, the present invention takes a new and improved approach to life cycle management. With the engineering management functions thus inventively consolidated, the actual purpose of the inventive Life Cycle Management becomes manifest: The inventive Life Cycle Management binds the Technical Core Process (TCP) functions together. Each of the TCP functions is an independent entity which is both autonomous and interrelated with every other TCP function. The inventive life cycle management system synthesizes the TCP functions into a coherent whole. Every TCP function interacts with every other TCP function. The TCPs support and are supported by each other. The function of the overall LCM is to ensure that the interaction occurs. The LCM process makes sure that one or more TCP functions do not diverge or split away or develop independently.

For instance, LCM makes sure that, if the Research and Development (R & D) TCP function develops a widget, that widget does not merely "sit on a shelf" in the event that someone needs it. If one of the TCPs is not "linked" to the others or funded properly, then the Life Cycle is weakened. As each of the TCPs and ICPs develop their process flow charts they will identify the "links". It is an essential function of the LCM to manage these links and make sure they happen. Thus, the LCM will be divided into major technical functional areas, as described herein and in the appendices. Each LCM division will be responsible for making sure that all the TCPs for their technical functional area are operating properly. All of the TCPs and ICPs are vital parts of the inventive "Operating Plan for Machinery." The processes inventively developed will perhaps define the way NSWCCD does business for the next decade and possibly beyond. The inventive LCM is the process that will bind together all these key business elements of NSWCCD.

At the time that NSWCCD took over the role of Life Cycle Management (LCM) from CO3, the definition, procedure, process and policy were not available to define the role of LCM. An important feature of the inventive OPM plan is the definition of two key parts, groups or categories, viz., the Life Cycle Model for Machinery and the Business Model for Machinery. The Life Cycle Model for Machinery is broken into eight functional subparts, while the Business Model for Machinery is broken into three functional subparts. The eight functional subparts of the Life Cycle Model for Machinery are the following: Life Cycle Management; Acquisition; Research and Development; Test and Evaluation; In-Service Engineering; Integrated Logistics Support; Program Management; Platform Management. The three functional subparts of the Business Model for Machinery are the following: Facility Planning; Budget Strategy; Contracting Requirements. The present invention thus features: the synthesis of all "technical" functions (e.g., per the "Life Cycle Mode for Machinery"); or, the synthesis of all "business" functions (e.g., per the "Business Model for Machinery") of managing machinery; or, the synthesis of all "technical" functions (e.g., per the "Life Cycle Mode for Machinery") and "business" functions (e.g., per the "Business Model for Machinery").

The inventive Operating Plan for Machinery has many advantages. The conglomeration of all of these subparts defines NSWCCD's business process; to the best of the inventors' knowledge, this process has never been defined previously by any organization, public or private. People who are involved with the operations of NSWC will be able to clearly see what's expected; customers will be able to gain full understanding of NSWCCD's Directorate 90's role and functions in LCM. Following the standardized procedure and process, Life Cycle products can be clearly defined and better tracked. Core functions of LCM will also be better defined and tracked, as will the proposals logged against them. The inventive OPM better illustrates links between individual processes to one another; without these links, the Life Cycle Model is weakened. Government studies for public functions will have a clearer understanding of NSWCCD's functions.

The present invention's unified, comprehensive and interactive approach to life cycle and business management is superior to one which would entail distinct groups which function autonomously and noninteractively. According to such a plan characterized by disconnectiveness, NSWCCD would proceed essentially with no overall process and allow different branches to create their own individual processes. The lack of nexuses among the various processes and the incohesiveness thereof would render the overall scheme relatively ineffective.

Other objects, advantages and features of this invention will become apparent from the following detailed description of the invention when considered in conjunction with the accompanying drawings.

BRIEF DESCRIPTION OF THE APPENDICES

The following appendices are hereby made a part of this disclosure:

Attached herein collectively marked APPENDIX A and incorporated herein by reference is a copy of the aforementioned manual entitled "Directorate 90 Operating Plan for Machinery," which was issued internally within Directorate 90 of the Naval Surface Warfare Center, Carderock Division as a first draft on Jul. 9, 1999. This appended manual (APPENDIX A) contains 82 pages.

Attached hereto collectively marked APPENDIX B and incorporated herein by reference are ten flow diagrams, marked "FLOW CHART B-1," "FLOW CHART B-2," "FLOW CHART B-3," "FLOW CHART B-4a," "FLOW CHART B-4b," FLOW CHART B-5a," "FLOW CHART B-5b," "FLOW CHART B-6," FLOW CHART B-7" and "FLOW CHART B-8." Each flow diagram corresponds to one of the eight external core function units or sections (viz., (1) Life Cycle Management, (2) Acquisition, (3) Research and Development, (4) Test and Evaluation, (5) In-Service Engineering, (6) Integrated Logistics Support, (7) Program Management and (8) Platform Management, respectively) of the "Life Cycle Model" (entailing external core functions) in accordance with the present invention. FLOW CHART B-4a and FLOW CHART B-4b both correspond to Test and Evaluation. FLOW CHART B-5a and FLOW CHART B-5b both correspond to In-Service Engineering. The flow diagrams contained in APPENDIX B are copies of printouts some of which are dated 3 May 2000, and are revised versions of equivalent or comparable flow diagrams contained in APPENDIX A. APPENDIX B contains 16 pages.

Attached hereto collectively marked APPENDIX C and incorporated herein by reference are three flow diagrams, marked "FLOW CHART C-1," "FLOW CHART C-2"and FLOW CHART C-3." Each flow diagram corresponds to one of the three internal core function units or sections (viz., (1) Facility Planning, (2) Contracting Requirements and (3) Budget Strategy, respectively) of the "Business Cycle Model" (entailing internal core functions) in accordance with the present invention. The flow diagrams contained in APPENDIX C are copies of printouts dated 4 May 2000, and are revised versions of equivalent or comparable flow diagrams contained in APPENDIX A. APPENDIX C contains 4 pages.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 1A and FIG. 1B together constitute a flow diagram illustrative of the establishment of an inventive operating plan, which can be considered to be embodied as a "Life Cycle Model" (comprising "external" core function units) and/or a "Business Cycle Model" (comprising "internal" core function units), in accordance with the present invention.

FIG. 2 is a block diagram illustrating an inventive operating plan embodied as a "Life Cycle Model" (comprising "external" core function units), in accordance with the present invention.

FIG. 4 is a block diagram illustrating an inventive operating plan embodied as the combination of a "Life Cycle Model" (comprising "external" core function units) and a "Business Cycle Model" (comprising "internal" core function units), in accordance with the present invention.

DETAILED DESCRIPTION OF THE INVENTION

Figure 1A:
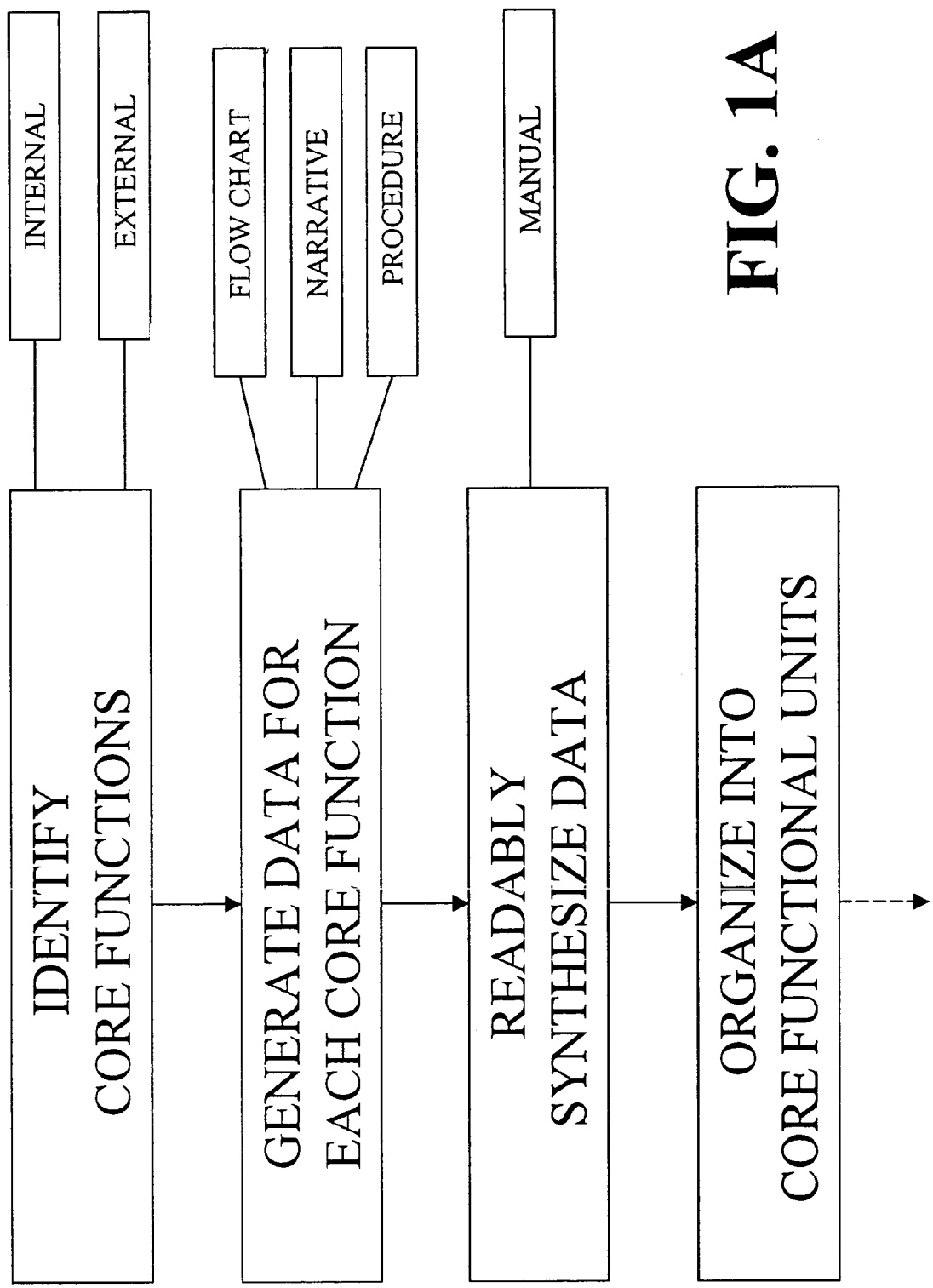

Referring now to the figures, and especially to FIG. 1A and FIG. 1B, the first stage in formulating an inventive organizational scheme for managing machinery throughout their life cycles involves the identification of core functions. According to the present invention's Operating Plan for Machinery, the core functions are divided into two categories, viz., "external" functions and "internal" functions. The external core functions are alternatively referred to as "technical" core functions, or "technical core processes" ("TCPs"), or "life cycle management" (LCM) functions. The external core functions comprise eight external core functions. The internal core functions are alternatively referred to as "business cycle management" (BCM) functions, "business" functions or "internal core processes" ("ICPs"). The internal core functions comprise three internal core functions.

Each core function requires production and presentation of information of at least three kinds, viz., substantive information, procedural information and graphic information. The substantive information, primarily textual, is "narrative" description directed toward an understanding of background, policies, purposes, rationales, objectives, scope, authorities, responsibilities, definitions, references, etc. The procedural information, also primarily textual, is generally a more structured format directed toward an understanding of procedures and processes, e.g., in terms of sequence of operations, and in terms of prescribing duties to be performed under various circumstances. The graphic information includes flow charts (flow diagrams) which detail not only the intra-function processes but also the inter-function processes; that is, the flow charts corresponding to each core function describe procedures autonomous to such core function as well as procedures interrelated with one or more other core functions.

To this end, the Navy established ten core functions teams. Seven core function teams corresponded to the external core functions; these teams were as follows: Life Cycle Management; Program/Platform Management; Research and Development; Acquisition Support; Logistics; Test and Evaluation; In-service Engineering. Three core function teams corresponded to the internal core functions; these teams were as follows: Facility Planning; Budget Strategy; Contracting Requirements. All of the core function teams were directed to define their respective core functions, develop their respective process flows, and identify their respective nexuses to other core functions. Each core function team presentation was to follow the prescribed "narrative," "procedure" and "flow chart" demarcations.

It is noted that a single core function team covered the external core function entitled "Program/Platform Management"; however, the Navy subsequently decided that the core function designated "program/platform management" could be better deemed to represent two core functions. Hence, the Navy separated "Program/Platform Management" into two core functional units, viz., "Program Management" and "Platform Management." This discrepancy (between the core functional teams and the core functional units ultimately established) exemplifies how inventive practice should be characterized by a degree of flexibility. In other words, frequently in inventive practice, the organizational structure in terms of core functional units may not crystallize until some time during or after the period in which core functions are identified and data produced in relation to each core function. Generally speaking, the established core functional units will bear some relation to the previously identified core functions; typically, the former will be commensurate with or at least roughly correspond with the latter.

Figure 3:
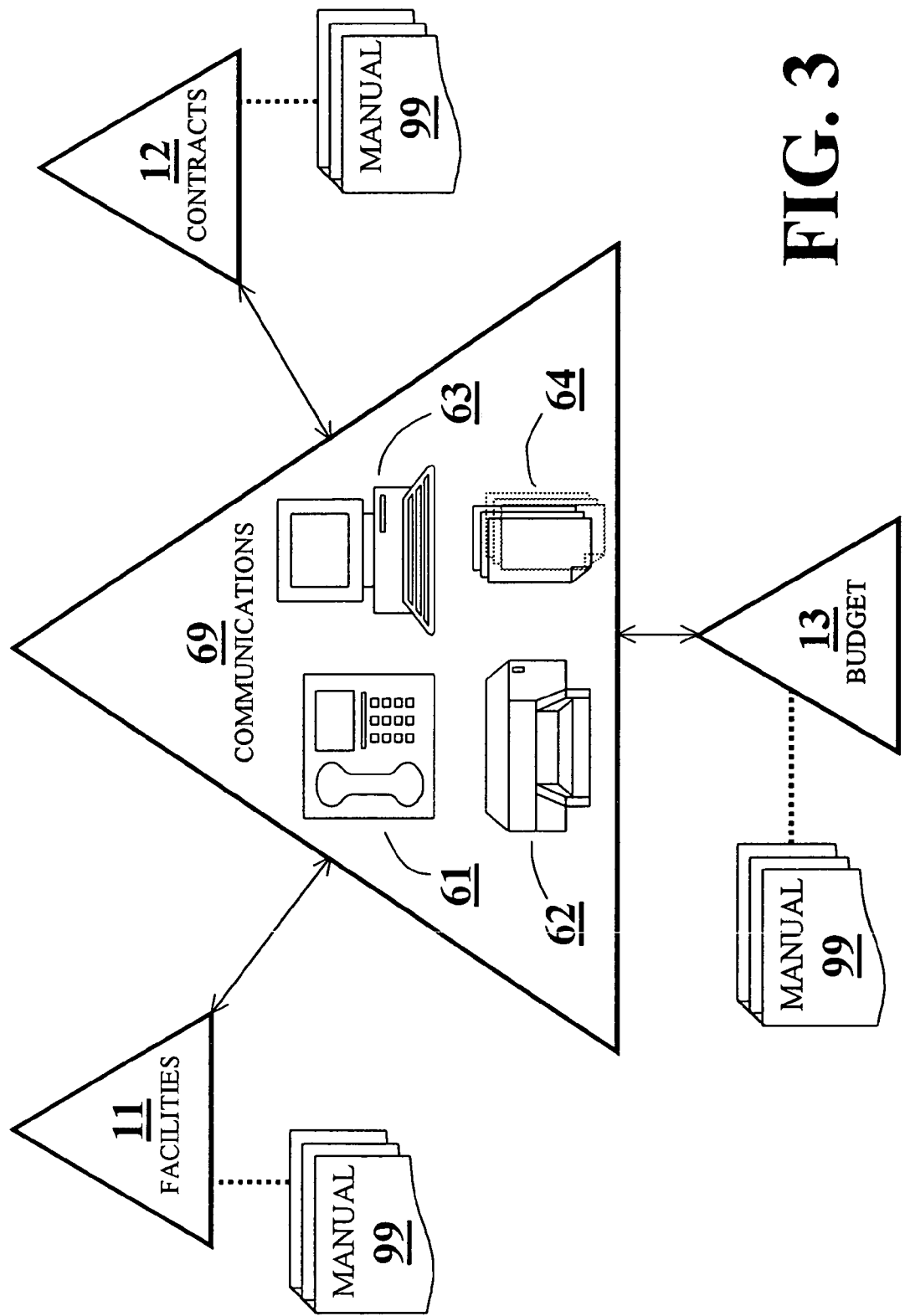
FIG. 3 is a block diagram illustrating an inventive operating plan embodied as a "Business Cycle Model" (comprising "internal" core function units), in accordance with the present invention.

All of the informational presentations pertaining to the respective core functions are gathered, assimilated and synthesized into a manual 99, such as shown in FIG. 2 through FIG. 4, for use by each of the core functional units. The "Directorate 90 Operating Plan for Machinery" (OPM) manual dated 9 Jul. 1999, APPENDIX A, is a synthesis, in writing, of the separate presentations into an integral reference guide for all of the core functional units. The Navy also rendered this manual in CD-ROM form. As shown in APPENDIX A, The manual's "Table of Contents" includes three main headings, viz., "I. Introduction," "II. Life Cycle Model for Machinery" and "III. Business Model for Machinery." The "Life Cycle Model for Machinery" represents the external core functions. The "Business Model for Machinery" represents the internal core functions. In the "Table of Contents," the "Life Cycle Model for Machinery" and the "Business Model for Machinery" each contain the same sub-headings, viz., "A. Flowcharts," "B. Narratives" and "C. Procedures."

It is pointed out that the order of the inventive steps illustrated in FIG. 1A and FIG. 1B is not critical. Nevertheless, inventive practice will generally prescribe the identification of core functions as the initial step in the inventive methodology.

Still referring to FIG. 1A and FIG. 1B and also referring to FIG. 2, FIG. 3 and FIG. 4, eight external core function units and three internal core function units were formed. As shown in FIG. 2, the eight external core function units were established in general correspondence with the seven external core functions originally identified. Similarly, as shown in FIG. 3, the three internal core function units were established in general correspondence with the three internal core functions originally identified.

Particularly with reference to FIG. 2, the eight external core function units are as follows: Life Cycle Management 1; Acquisition 2; Research and Development 3; Test and Evaluation 4; In-service Engineering 5; Integrated Logistic Support 6; Program Management 7; Platform Management 8. Each core function unit has been provided, and has at its disposal, a hard copy of manual 99. Other forms or renderings of manual 99 (e.g., a CD-ROM version, or a computer intranet database) can also be made available to every external core function unit. Communications system 69, which links every external core functional unit to each other, includes telephone means 61, facsimile transmission means 62, computer means 63 and paper correspondence means 64. Computer means 63 preferably includes electronic mail means and can also include computer intranet means. Paper correspondence means 64 preferably includes a mailing system for transmitting documents from on core function unit to another. Each external core function unit also possesses similar communications capabilities within such unit. In other words, in inventive practice, communications system 69 would typically presuppose intracommunications means within each external core function unit as well as intercommunications means between/among the external core function units.

Particularly with reference to FIG. 3, the three internal core function units are as follows: Facilities 11; Contracts 12; Budget 13. The core function unit designation "facilities" 11 is basically synonymous with the core function designation "facility planning," The core function unit designation "contracts" 12 is basically synonymous with the core function designation "contracting requirements." The core function unit designation "budget" 13 is basically synonymous with the core function designation "budget strategy." As is the case with the external core function units, each internal core function unit has been provided, and has at its disposal, a hard copy of manual 99. Other forms or renderings of manual 99 (e.g., a CD-ROM version, or a computer intranet database) can also be made available to every internal core function unit. Communications system 69, which links every external core functional unit to each other, includes telephone means 61, facsimile transmission means 62, computer means 63 and paper correspondence means 64. Computer means 63 preferably includes electronic main ("e-mail") means and can also include computer intranet means. Paper correspondence means 64 preferably includes a mailing system for transmitting documents from on core function unit to another. Each internal core function unit also possesses similar communications capabilities within such unit. In other words, in inventive practice, communications system 69 would typically presuppose intracommunications means within each internal core function unit as well as intercommunications means between/among the internal core function units.

In accordance with the present invention, the internal core function units (core function units 1, 2, 3, 4, 5, 6, 7 and 8) and the external core function units (core function units 11, 12 and 13) can be consolidated into an integral life cycle/business methodology, such as shown in FIG. 4. As shown in FIG. 4, every core function unit, external and internal, is involved in communications system 69 and has its own reproduction of the same manual 99 associated therewith. In inventive practice, communications system 69 would typically presuppose intracommunications means within each internal or external core function unit as well as intercommunications means between/among the internal and external core function units. Alternatively, stand-alone inventive operating plans can comprise external core function units only (such as shown in FIG. 2) or internal core function units only (such as shown in FIG. 3).

The same manual 99 is used by every core function unit and keeps the core function units "on the same page. "Manual 99 is not an "etched-in-granite" document. Rather, manual 99 is an ever-changing document representative of a dynamic, ongoing process. Preferably, periodically updated editions of manual 99 will be part and parcel of the inventive business plan. Preferred inventive practice prescribes the institution of a timetable (e.g., every six months) for periodic submissions by core functional units of their corresponding updated sections of manual 99. Ideally, the "management workflow channels" would continually be enhanced, e.g., added to, subtracted from or otherwise changed.

Fundamental to the inventive life cycle management system is the continuous pursuit of improvement—in particular, the constant endeavor to find and secure "connections" between one's own core functional unit and one or more other core functional units. The cohesiveness of the inventive business plan is founded especially on two linchpins, namely, communications and connections. "Communicate" and "connect" are two of the the inventive watchwords. As depicted in FIG. 2 through FIG. 4, communications system 69 in various ways advances communication among the core function units, thereby facilitating operation of the inventive business plan, and also thereby advancing the cohesiveness thereof as its participants continually strive for new or better ways to connect across core function unit demarcations. The changes in terms of "connectiveness" are continually manifested in manual 99, in the procedures therein and especially in the flow diagrams therein.

As illustrated in FIG. 2 and FIG. 4, each of the external core function units (also referred to as "technical core processes," or "TCPs") is shown as an octagonal block. The present invention's life cycle management (LCM) is a force (envisionable as an outer ring in FIG. 2) which binds the external core function units and prevents their separation. Similarly, as illustrated in FIG. 3 and FIG. 4, each of the internal core function units (also referred to as "internal core processes," or "ICPs") is shown as a triangular block. The present invention's business cycle management (BCM) is s force (envisionable as an outer ring in FIG. 3) which binds the internal core function units and prevents their separation. As depicted in FIG. 4, the external core units and the internal core units can be combined into a unitary business methodology wherein the invention's life and business cycle management (LCM and BCM) is a force (envisionable as an outer ring in FIG. 4) which binds the external core functions and the inteal core function units and prevents their separation.

The core function units all overlap one another in a functional sense. That is, all of the core function units must interact with and support each other. The inventive life cycle management ensures that the interaction among the core function units occurs, and that none of the core function units splits away and develops independently. For instance, the inventive life and business cycle management would not permit a situation wherein a product which is developed by the external core function unit denoted "Research and Development 3" is needed by others, and yet the product sits on a shelf unbenownst to others. If one of the core function units is not "linked" to the others or funded properly, then the inventive life and business cycle is weakened. As each of the external core function units (TCPs) and internal core function units (ICPs) develop their process flow charts, they will identify the "links". It is an essential overall function of the inventive life and business cycle management to manage these links and make sure they happen.

Each of the external core function units is considered in turn hereinbelow.

1. Life Cycle Management a. General Description

Life Cycle Management (LCM) is the process of managing all aspects of machinery to ensure ships continue to perform their mission. The aspect of machinery includes the entire life cycle from conception through implementation. The Life Cycle Manager is responsible for maintaining metrics to improving system reliability, maintainability and availability, reducing total ownership costs, reducing cycle time for introducing new or enhanced capabilities into the fleet, and further the integration of machinery into the Battle Force and Battle Group.

b. Existing Condition

Previously the responsibility of LCM for machinery was managed at NAVSEA while many of the support functions were located at Philadelphia. Due to BRAC and NAVSEA downsizing the LCM functions for machinery are currently being transferred to NSWCCD-SSES. This new responsibility required clear definition.

c. Faults of Existing Condition

A variety of shortcomings existed in the processes of LCM. Each LCM performed independently and differently from one another. There existed no consistency of process between LCMs. It was not always evident who the point-of-contact (POC) for a particular LCM was. In addition, while LCM was located at NAVSEA and ISE at NSWCCD, there existed: redundant capabilities and inefficiencies; lack of continuity of communication between organizations; cost overlaps between LCM and ISE.

d. Key Features and Improvements

The Life Cycle Model was designed as the solution to previous deficiencies in Life Cycle Management of machinery. With all key elements of LCM combined, it was evident a process needed to be defined. It was determined that LCM is the core function which binds all technical functional areas together including Program Management, Platform Management, Research & Development, Acquisition, Integrated Logistics Support, Test & Evaluation and In-Service Engineering. The key to the inventive improvement is the combination of developing the process for each function, documenting those processes and identifying the links between each process. The documentation of the complete process is present in the form of narratives, flow charts, and procedures which are included in APPENDIX A.

LCM responsibilities moved under the existing technical authorities who also posses the responsibility of In-Service Engineering (ISE). LCM responsibilities have been subdivided among the following twenty technical authorities: (1) Life Support Systems/AC&R/HVAC and Air Systems; (2) Main & Auxiliary Boiler Systems and Catapult Accumulators; (3) Pumps, Fluid Systems & Auxiliary Steam Turbines; (4) Steam System Controls; (5) Diesel Engines; (6) Non-Nuclear Power Transmission; (7) Electric Power Systems; (8) Gas Turbine Systems; (9) Logistics Data; (10) Sensors; (11) Machinery Controls; (12) CBM Systems; (13) Submarine Antennas; (14) Integrated Bridge & Machinery Interface Systems; (15) Networking Systems for Machinery; (16) Ship handling & Deck Machinery; (17) Integrated Cargo/Weapons Handling Systems; (18) Hull Outfitting & Closures; (19) Ship & Submarine Steering, Diving, Maneuvering & Hydraulics; (20) Habitability.

A process plan was developed for LCM under each of the technical authority. Each LCM has been empowered to perform the following:

(i) Prepare and execute a system level LCM Master Plan. The plan identifies the next five to seven year life cycle management requirements at the system level including prioritized fleet problems and associated solutions (i.e. Gas Turbine LCM Master Plan). The plan also specifies the total workload/requirements for all applicable ship classes (cross-platform plan) including R&D, ISE, SSA, T&E, LCM, Ship Acquisition, Program Management and installation/backfits.

(ii) Continuously monitor and track ISE system performance data (metrics). Compare goals vice actual performance data.

(iii) Perform as the system expert, maintaining a knowledge base of all aspects of the system.

(iv) Interface with the fleet on a regular basis to discuss issues, concerns and potential changes to hardware, software, maintenance, logistics and training.

(v) Submit system program planning information and long-term funding requirements throughout the appropriate Program/Platform office.

(vi) Ensure each LCM is linked to all associated LCM for system interoperability to guarantee a fully integrated ship.

e. Advantages

With the defined process, LCM was assured to be performed consistently under each technical authority. Each associated step within the process is now weighted similarly across technical authorities.

LCM linking each TCPs ensures all must interact and support each other. Linking also, guarantees all areas are funded properly.

Reduction of Life Cycle costs due to overlap of functions within the technical authorities responsible for both LCM and ISE. In addition, the current streamed lines processes are expected to reduce LCM costs.

The documented procedures of LCM contains inherit advantages. The documented process lends itself to improvement as the process evolves. The documented process serves to accommodate auditing. The procedures are able to be certified which contribute to a competitive US Naval and commercial advantage.

2. Acquisition a. General Description

Acquisition engineering serves to support HM&E systems by providing quality products at reasonable prices in a timely manner. Within the acquisition process, several phases occur to develop and execute the acquisition program applicable to its respective user. It is the role of the various program offices in acquisition and logistics to discover methods to improve the overall efforts of these operations while maintaining and increasing efficiency.

b. Existing Condition

NSWCCD-SSES' acquisition program has always been actively engaged at all stages of the new ship class acquisition process. NSWC representatives have been stationed at various program offices carrying out the functions specific to that phase of the acquisition cycle. Representatives initiate communication between necessary parties and dictate all steps needed to move the process onto the next phase until all milestones are reached and completed.

c. Faults of Existing Conditions

While the overall definition of the acquisition process is clearly understood the roles, responsibilities, and functions within each of its phases were not adequately defined. There is no standardized procedure for each of the acquisition phases that would allow the program offices to feel any sense of cohesion. There are no listed formats as to the proper way to receive, record, and send data between various offices. This lack of consistency results in delays that could otherwise be avoided in the acquisition process.

d. Key Features and Improvements

The implementation of the Operating Plan for Machinery (OPM) would accommodate the acquisition program's need to integrate different program offices. Data among all the offices would be standardized allowing for the synchronization of data calls. An important link between acquisition and the new program management would also be demonstrated in the OPM. The inclusion of this link cites the acquisition program's incorporation into NSWCCD-SSES' overall operations and not just as a separate function unto itself. Communications among program offices and other branches of the Life Cycle Model for Machinery would not be strained. All these functions enable the acquisition process at NSWCCD-SSES to function smoothly and at a more efficient level.

e. Advantages

The OPM will allow the program to follow a detailed process, assist communications, and standardize the business procedures of the organization's structure by doing the following: provide standard procedures for a variety of representatives in a multitude of locations; provide our insight to various acquisition programs; allow the life cycle managers to execute their future plans on future ship platforms.

3. Research and Development a. General Description

The product of Research and Development (R&D) is an operational capability. Hardware is but one subsystem of operational capability. The elements of the total system required to provide an operational capability include equipment, people, facilities, material and information.

Equipment includes system hardware plus equipment (trainers, support equipment, etc.) required for its effective utilization and support.

People include trained crews and maintenance personnel plus the support system required for their continuing development and the training of their replacements.

Material includes consumables, spares, etc.

Information includes technical, computer programs, maintenance data, operating tactics, maintenance procedures, etc.

The function of R&D in the development of operational capabilities is the production of the information required to achieve such capabilities R&D is a multistage information generation and conversion process characterized by the integration and conversion of information within stages and information flow coupling between stages.

b. Existing Condition

Although the Navy itself has a very detailed procedure for the research and development of technological concepts for shipboard systems, it is not define where or how NSWCCD-SSES fits in to their overall process. NSWCCD-SSES does some research and development, but there is no process or explanation as to how R&D attempts to meet the Navy's need to apply developmental and transitional technology to existing ship systems.

c. Faults of Existing Condition

No standard process exists for the operations of research and development at NSWCCD-SSES. While New Ship Acquisition programs are based on a fairly defined process, R&D is lost in the big picture and needed a more detailed procedure of its own phases.

d. Key Features and Improvements

The OPM simply analyzes and defines all the key elements involved in R&D operations. Everything from initial concepts to execution of technology implementation and sponsor funding is explained in the form of procedures. Responsibilities and the reasons why functions are performed are also detailed.

e. Advantages

The goals of R&D are more thoroughly outlined via flowcharts and narratives. These flowcharts also incorporate functions of other NSWCCD-SSES programs into the R&D process. Upon examination, the interdependent business operations of the entire organization are easier to understand.

4. Test and Evaluation a. General Description

The functions of the Test and Evaluation (T&E) process at NSWCCD-SSES are designated for both shipboard and land-based testing. Their objectives include identifying what is to be proved by testing and what is to be needed to perform testing while maintaining all standards and providing the required documentation. They are responsible for assessing the ship area where the equipment will be installed or the land test facility that will support the needs of the testing. Modifications are made to the structural configurations of test areas if necessary. In developing and producing design packages to modify existing sites, reviews of plans must be made in accordance with outside programs, generating a sequence of links throughout NSWCCD-SSES's operations.

b. Existing Condition

Prior to the inventive OPM, no distinction was made between the procedures of land-based and shipboard testing. There was somewhat of a process for land-based testing, and a process existed for shipboard industrial work, but none for shipboard testing. Because of that, safety and environmental conditions were never taken into account.

c. Faults of Existing Condition

Without a process distinguishing the two kinds of testing, there was no way to document that T&E was not in violation of safety or environmental regulations.

d. Key Features and Improvements

A main feature of the inventive OPM is that land-based testing and shipboard testing is broken down into two separate processes. This allows for T&E to follow safety conditions respective to their testing.

e. Advantages

Test sites are now safer because environmental conditions are considered. The proper NAVSEA tech specs for land-based and shipboard blue collar are followed. The differentiation made between land-based and shipboard testing enables T&E to actively ensure that its following all environmental regulations and assisting in the safety of its workers.

5. In-Service Engineering a. General Description

The Life Cycle Model for Machinery integrates all aspects of machinery engineering. A critical role for NSWCCD-SSES is to provide engineering support throughout the life cycle of HM&E equipment and systems. This effort involves an intense engineering effort throughout the shipboard life of the machinery. This effect is broken down into four distinct categories of data analysis/management, maintenance engineering, design engineering, and installation engineering. Throughout these procedures, it is the continuing task of ISE to impact and maintain performance, reliability, availability, logistic support, safety, and lifestyle cost in all its operations.

b. Existing Condition

NSWCCD-SSES has always been tasked in-service engineering (ISE) machinery modifications. ISE is critical in monitoring machinery in ships. Because of this long-term commitment to shipboard maintainability, there is a strong, focused understanding of machinery. Now, ISE has been incorporated as a subset of Life Cycle Management, where the scope has been widened but not clearly defined. Whereas ISE was formerly expected to understand the present condition of equipment and systems, they are going to be actively involved in the technological future of those systems. The modifications they perform today must be done with the vision of what's to come.

c. Faults of Existing Condition

ISE should have always been integrated with Life Cycle Management because its former situation did not allow it to improve or develop. Under past conditions, people were pigeonholed into equipment specialties instead of becoming acquainted with whole systems. While individuals may have become experts at their respective projects, their focuses became too narrow. The manual will ensure ISE engineers define standard metrics affecting machinery.

d. Key Features and Improvements

The OPM helps to outline and illustrate a few significant points that are not otherwise addressed collectively in a reference format. These points include engineering forms different than ISE that will be integrated into Life Cycle Management, optimizing more resources of knowledge. ISE will be tied into all aspects of machinery from concept to final equipment disposition. The OPM forces people to look at the entire life cycle of a piece of machinery, including future requirements. The manual will also standardize engineering procedures for both equipment and systems. In addition to that, the manual focuses on ISE as a cooperation of four separate engineering entities: data analysis/management, design engineering, installation engineering, and maintenance engineering. Just as the Life Cycle Model for Machinery emphasizes that the business at NSWCCD-SSES is an interdependency of 8 different programs, ISE is viewed as a similar interdependency of those four engineering functions.

e. Advantages

NSWCCD-SSES constantly strives to find avenues of improvement within its operations. The approach taken by the inventive OPM addresses ISE's need to pool and organize information together to serve as an even greater source for the modification of shipboard systems. The OPM does the following to improve ISE's service to its users: forces ISE people to collect metrics; allows/helps engineers to work together; brings installation engineering knowledge of machinery into data analysis/management, maintenance engineering, and design engineering, and vice versa.

Recognizing the common denominator each process shares with one another helps sponsors and users have a better understanding of how modifications to shipboard systems are worked through.

6. Integrated Logistics Support a. General Description

Integrated Logistics Support is the process on developing, maintaining, improving, managing and delivering technical documentation for all Hull, Mechanical and Electrical (HM&E) equipment and systems in the Navy. NSWC is the Navy's source and repository of fully integrated logistics products for HM&E systems. These products are delivered to the fleet and other customers in a fully automated and interactive environment. The products include: Life Cycle Cost Analysis (LCC); Reliability, Maintainability & Availability (R,M & A); Planned Maintenance Systems (PMS); Surface Ship Maintenance Effectiveness Review (SURFMER); Operational Sequencing System (OSS); Technical Manual (TM); Navy Training System Plans; Electronic Training Media; Allowance Support Documentation; Provisioning Technical Documentation.

b. Existing Condition

Previously, the process of updating logistics elements across all products was not defined. A logistics change would be identified from a variety of sources. It could be initiated from T&E, ISE, Acquisition, Program Management, Platform Management, or R&E due to feedbacks, alterations, advisory or ECP. Each of these areas used an array of personnel to interface with an array of logistics personnel. In addition, a variety of proprietary systems and tools were used to produce the various logistics products in an assortment of formats.

c. Faults of Existing Condition

The logistics department had identified many problems with the previous method of business. There was no full proof method that all other logistics products impacted were updated. Cost of logistics to the customer varied depending on the avenue entering the NSWCCD and the Logistics Department. There existed no consistency of interaction between core technical areas and each of the logistics area. The cost of funding the various proprietary tools was exorbitant for each logistics element and redundant across logistics areas. The end products produced were inconsistent among logistics products causing confusion to the end users.

d. Key Features and Improvements

Improvements can be unfolded into two key areas. First, the Integrated Logistics Support Process has been defined and linked to all technical core areas and infused within the Life Cycle Model. The documentation of this process is present in the form of narratives, flow charts, and procedures which are included as exhibit (A) under Integrated Logistics support. Second, the use of non-proprietary automated logistics tools with non-proprietary integrated logistics product formats have recently matured to a fully functional state.

The links to and from all the technical core areas are the bond which tie and hole the logistics element to all other elements. Within the Logistics Support Process the Logistics Product Advocate (LPA) arrangement has been developed to promote the linked processes. An LPA position was developed for each of the existing departments. Interface roles were initially defined and constantly redefined to correct all deficient conditions. Presently roles include the following:

(i) LPA liaisons with the Logistic Department, ISEA, and OEM to ensure lines of communications are open.

(ii) LPA must meet with the team involved in each task to review the ILS checklist determining logistics impact. The Logistics Department will provide a complete history of each product to aid in the full understanding of impact.

(iii) Estimates will be obtained for completing the task. All related deficient logistic data will be researched in an effort to clear all deficiencies.

(iv) The LPA will provide a single NSWC estimate to the originator.

(v) When the task is funded, the LPA will provide funding to all groups involved. If for any reason the task is unfunded, it will be held pending for future consideration.

(vi) When the technical information is developed by the ISEA, the LPA will provide the information to the Logistics Department.

(vii) The Logistics Department will follow their documented procedures to produce and distribute the final product to all appropriate customers.

From its inception, the logistics department has continually strived to improve the creations, editing, managing, and production of logistics products by taking advantage of Information Technology. Until recently, all logistics documents had always been in one proprietary format or another. This fact resulted in total dependence on specific contractors for customized tools to edit documents and to manage the database, and also to produce print packages and CD-ROMs. Recently all logistics documents have been converted to an open format. This open format allowed for the selection of competitive support tools. In addition, all logistics elements can and do use the same support tools over the life of the products. Finally, the ILS department has developed mature logistic ship configuration support system. These systems ensure accurate logistics products are produced for all areas within each ship in the fleet.

e. Advantages

The Integrated logistics process will always be linked to all other Technical Core Processes lending to a strong bond and continuous cohesion.

All logistics elements impacted will be updated regardless of source initiation task.

Cost of logistics to the customer will be consistent for all customers against all logistics products.

The LPA acting as the "One Stop Shopping" POC for any logistics product eliminates customer confusion which lends to ease of doing business with ILS.

Cost to for Logistics support tools has decreased significantly. Logistics automated support tools are acquired competitively lending to functionally strong tools at competitive costs. Moreover, use of the same tools across for each logistics elements has lowered tool costs within the ILS Department. The savings are realized by the use of a consolidated support staff (which has lower support staff costs), and by the use of shared concurrent software licenses (which has lower license costs).

Due to the competitive tool environment, increased flexibility was realized which is needed to respond quickly to unexpected events which are inherent demands within the Navy.

Due to the same tools used for each logistics production product, the end products are produced similarly. This works toward minimization of customer confusion.

The ILS department can ensure each ship has accurate logistics products by using reliable configurations systems.

7. Program Management a. General Description

Program management is the process of working with and through other people and using appropriate resources to meet the specified program requirements within cost, on schedule, and at a performance level that satisfies the customer/sponsor. In executing program management, the Program Manager must effectively accomplish a number of management functions during the program's life cycle. These management functions include initiating, planning, executing, managing and closing. Program management must first take into account diverse interests and points of view. Second, it facilitates tailoring the management system and techniques to the uniqueness of the program. Third, it represents integration of a complex system of differing but related functional discipline areas that must work together to achieve program goals.

b. Existing Condition

Program management is involved with everything from new ship acquisitions, alterations, the enabling of technology, research anddevelopement, and large scale test facilities. Each program formerly followed its own process is those given areas in order to accomplish their individual tasks but in coordination to the organization. The chief principles of program management are to initiate, manage, and plan.

c. Faults of Existing Condition

The interface between program management and the rest of the organization was lacking. What made something a program was never defined, and the evaluation of whether or not something should be considered a program was never defined. There also appeared to be no consistent way to gather and develop information necessary of a proposal for a program. Also, status reporting to program sponsors, as opposed to platform sponsors, was never detailed.

d. Key Features and Improvements

The responsibilities and functions of program management are more accurately described in the inventive OPM. Not only that, but the OPM explains how the functions of a program manager correspond with outside departments and programs.

e. Advantages

The scope of program management is great, but the OPM helps to clearly examine the components necessary to support all aspects ofNSWCCD-SSES in an efficient manner. The critical elements ofprogram managing are extensively evaluated, allowing for proper execution of the process.

8. Platform Management a. General Description

Platform Management is the process of interfacing our engineering and support codes with our platform sponsors. Their mission is to use appropriate resources to meet the specified requirements within cost, on schedule, and at a performance level that satisfies our customers. Three critical roles of the Platform Managers are to gather proposals, track products, and provide information.

b. Existing Condition

There are two platform managements: one that is engaged in surface combatant operations, and another involved with all other platforms. A platform is a class of ships or group of similar classes of ships. It is the responsibility of platform management to manage money, proposals, feedback, and to interface with the platform sponsor for the various platforms. Each platform management, and platform themselves, operated under its own process autonomously.

c. Faults of Existing Condition

Because each platform managed itself, there was no consistent type of proposals, way to track finances, or follow trending. Sponsors were then unable to follow an unobstructed path of work done from one ship to the next and how their money was being handled because none of it was done in the same way for each platform.

d. Key Features and Improvements

The inventive OPM standardizes all platform management functions. This allows for life cycle functions to stretch across all platform areas and sponsors to have the same vantage-point for all business they conduct with NSWCCD-SSES. The path of money can be better followed through the operation structure.

e. Advantages

Although all groups interface with one another, program and platform management are the central nodes to interface with because of their direct interface with sponsors. This system is an effective way to balance finances to products, ensuring sponsors that their finances are being properly used in an efficient way thus gaining their confidence in the organization.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A method of organizing and effecting a dynamic and comprehensive workflow management system for an entity in control of various kinds of machinery, said workflow management system using a computer network that permits computer access to a server capable of containing a centralized database pertaining to said workflow management system, said method comprising:

identifying all of the individual core management functions that relate to the overall management of all of the machinery controlled by an entity, said overall management encompassing the entire life cycles of said machinery, said core management functions consisting of internal core management functions and external core management functions, each said internal core management function involving specialized management of a business aspect of said overall management, each said external core management function involving specialized management of a technical aspect of said overall management, said internal core management functions including contracts management, budget management, and facilities management, said external core management functions including life cycles management and engineering management, said engineering management involving at least one type of engineering related to said machinery including in-service said machinery, said at least one type of engineering being selected from the group consisting of data engineering, design engineering, installation engineering, and maintenance engineering;

producing information pertaining to said core management functions, said information including plural individual workflow descriptions, each said individual workflow description describing a said core management function and establishing at least one linkage of said individual workflow description with at least one other said individual workflow description;

establishing core management function units, said core management function units at least substantially representing said core management functions;

formulating a coherent presentation essentially integrating said information, said coherent presentation encompassing a multiplicity of tasks, said coherent presentation representing an operational plan for performing all of said tasks, the performance of each said task commencing in a said core management function unit, at least some said tasks being performed in plural said core management function units based on said at least one linkage of said individual workflow description with at least one other said individual workflow description;

uploading said coherent presentation to said server for storage in said centralized database, said coherent presentation being computer-accessible by said core management function units;

performing at least one said task, said performance of at least one said task including use of said coherent presentation; and updating said coherent presentation at least once, each said updated coherent presentation being computer-accessible by said core management function units, each said updating including uploading at least a portion of a said individual workflow description describing a said core management function so as to render at least one change to the preceding said individual workflow description describing the same said core management function, said at least one change including modification with respect to said at least one linkage of said individual workflow description with at least one other said individual workflow description.

2. The method according to claim 1, wherein said external core management functions further include at least one external core management function selected from the group consisting of acquisition management, research and development management, test and evaluation management, integrated logistic support management, program management, and platform management.

3. The method according to claim 1, wherein said external core management functions further include acquisition management, research and development management, test and evaluation management, integrated logistic support management, program management and platform management.

4. The method according to claim 2, wherein said life cycles management is the linchpin external core management function for all of said external core management functions.

5. The method according to claim 3, wherein said life cycles management is the linchpin external core management function for all of said external core management functions.

6. The method according to claim 1, wherein each said individual workflow description includes narrative description, procedural description and flow diagrammatic description.

7. The method according to claim 1, wherein said coherent presentation includes a manual, wherein said manual includes narrative description, procedural description and flow diagrammatic description for each core function.

8. The method according to claim 1, wherein said external core management function units include a life cycle management unit and an engineering management unit, and wherein said external core management function units further include at least one external core management function unit selected from the group consisting of acquisition management unit, research and development management unit, test and evaluation management unit, in-service engineering management unit, integrated logistic support management unit, program management unit, and platform management unit.

9. The method according to claim 1, wherein said internal core management function units include a facilities management unit, a budget management unit, and a contracts management unit.

10. The method according to claim 1, wherein:
said external core management function units include a life cycle management unit and an engineering management unit;
said external core management function units further include external core management function units selected from the group consisting of acquisition management unit, research and development management unit, test and evaluation management unit, integrated logistic support management unit, program management unit and platform management unit; and
said internal core management function units include a facilities management unit, a budget management unit, and a contracts management unit.

11. The method according to claim 1, wherein:
said external core function management units include a life cycle management unit, an acquisition management unit, a research and development management unit, a test and evaluation management unit, an engineering management unit, an integrated logistic support management unit, a program management unit, and a platform management unit; and said internal core function management units include a facilities management unit, a budget management unit, and a contracts management unit.

12. The method according to claim 1, said method further comprising instituting communications among said core management function units, said instituting communications including instituting at least one type of communications selected from the group consisting of telephone, telefax, paper correspondence and electronic mail.

13. The method according to claim 1, said method further comprising distributing hard copies of said coherent presentation among said core management function units.

14. The method according to claim 1, wherein said producing information pertaining to said core management functions includes establishing plural teams, each said team being charged with submitting a section of said information that characterizes a different said core management function.

15. A method for defining and executing the flow of management operations of an organization that controls a variety of machinery, said method making use of a central computer and plural workstation computers connected to said central computer, said method comprising:

establishing plural organizational units, each said organizational unit availing itself of at least one said workstation computer, said establishing including proposing initial core functions and assembling informational segments, each said informational segment describing the functional flow associated with a said initial core function, the functional flow associated with each said initial core function being characterized by at least one nexus between said functional flow and the functional flow associated with at least one other said initial core function, said establishing plural organizational units further including designating refined core functions, said refined core functions at least substantially corresponding to said initial core functions, each said organizational unit performing a said refined core function, said refined core functions being every core function relating to the overall management of every item of machinery controlled by an organization, said overall management encompassing the entire life cycles of said machinery, said refined core functions consisting of internal refined core functions and external refined core functions, each said internal refined core function involving specialized management of a business aspect of said overall management, each said external refined core function involving specialized management of a technical aspect of said overall management, said internal refined core functions including contracts management, budget management, and facilities management, said external refined core functions including life cycles management and engineering management, said engineering management involving at least one engineering area related to said machinery including said machinery that is in service, said at least one engineering area being selected from the group consisting of data engineering, design engineering, installation engineering, and maintenance engineering;

formulating a manual that is at least substantially arranged in accordance with said organizational units and said refined core functions respectively performed by said organizational units, said manual covering at least substantially all of the undertakings of said organization, said manual at least substantially incorporating said informational segments so as to prescribe said flow of management operations both intrarelationally within each said organizational unit and interrelationally between said organizational units, the functional flow associated with each said refined core function being characterized by at least one nexus between said functional flow and the functional flow associated with at least one other said refined core function, said manual prescribing action to be taken for carrying out each said undertaking, each said undertaking requiring action to be taken by at least one said organizational unit, at least some said undertakings requiring action to be taken by at least two said organizational units, wherein each said undertaking that requires action to be taken by at least two said organizational units is carried out in accordance with at least one said nexus between two said functional flows associated with said refined core functions respectively performed by said at least two said organizational units;

storing said manual in said central computer for computer access by said organizational units, said manual being stored in a form electronically modifiable by each said organizational unit;

carrying out at least one said undertaking, at least one said undertaking being carried out so that action is taken by at least two said organizational units; and maintaining currency of said manual as stored in said central computer, said maintaining currency including electronically modifying of said manual, by at least one said organizational unit, with respect to at least one nexus between the respective functional flows associated with at least two said refined core functions.

16. The method for defining and executing the flow as recited in claim 15, said method further comprising disseminating hard copies of said manual to said organizational units.

17. The method for defining and executing the flow as recited in claim 15, wherein said external refined core functions further include acquisition, research and development, test and evaluation, integrated logistic support, program management, and platform management.

18. The method for defining and executing the flow as recited in claim 15, said method further comprising enabling communication among said organizational units in furtherance of said flow of management operations, wherein said enabling communication includes instituting at least two communication means selected from the group consisting of telephone, telefax, correspondence and e-mail.

19. The method for defining and executing the flow as recited in claim 15, said maintaining currency including formulating a scheduling policy for continually improving said flow of management operations, said formulating a scheduling policy including prescribing the periodic updating of said manual.

20. The method for defining and executing the flow as recited in claim 19, wherein said periodic updating of said manual includes said electronically modifying of said manual.

21. The method for defining and executing the flow as recited in claim 15, wherein said electronically modifying of said manual includes adding at least one nexus between the respective functional flows associated with at least two said refined core functions.

22. The method for defining and executing the flow as recited in claim 15, wherein said electronically modifying of said manual includes removing at least one nexus between the respective functional flows associated with at least two said refined core functions.

* * * * *